United States Patent
Agarwal et al.

(10) Patent No.: US 8,711,927 B2
(45) Date of Patent: Apr. 29, 2014

(54) SYSTEM AND METHOD FOR VIDEO ENCODING

(75) Inventors: Megha Agarwal, Delhi (IN); Sumit Johar, New Delhi (IN); Kaushik Saha, Delhi (IN); Emiliano Mario Piccinelli, Cavanego di Brianza (IT)

(73) Assignees: STMicroelectronics International N.V., Amsterdam (NL); STMicroelectronics S.r.l., Agrate Brianza (IT)

( * ) Notice: Subject to any disclaimer, the term of this patent is extended or adjusted under 35 U.S.C. 154(b) by 398 days.

(21) Appl. No.: 12/636,321

(22) Filed: Dec. 11, 2009

(65) Prior Publication Data

US 2010/0158108 A1 Jun. 24, 2010

(30) Foreign Application Priority Data

Dec. 11, 2008 (IN) ............................ 2802/DEL/2008

(51) Int. Cl.
*H04N 7/26* (2006.01)

(52) U.S. Cl.
USPC ...................................... 375/240.03; 382/251

(58) Field of Classification Search
USPC ........................................ 375/240.02–240.06
See application file for complete search history.

(56) References Cited

U.S. PATENT DOCUMENTS

| | | | | |
|---|---|---|---|---|
| 5,144,424 A | * | 9/1992 | Savatier | 375/240.03 |
| 2002/0163966 A1 | * | 11/2002 | Ramaswamy | 375/240.03 |
| 2003/0223492 A1 | * | 12/2003 | Drezner et al. | 375/240.2 |
| 2004/0062313 A1 | * | 4/2004 | Schoenblum | 375/240.25 |
| 2004/0228538 A1 | * | 11/2004 | Onuma et al. | 382/239 |
| 2006/0018553 A1 | * | 1/2006 | Lee | 382/232 |
| 2006/0165165 A1 | * | 7/2006 | Mohsenian | 375/240.03 |
| 2006/0176953 A1 | * | 8/2006 | Mohsenian | 375/240.03 |

OTHER PUBLICATIONS

"A Rate Control Algorithm for DCT-Based Video Coding Using Simple Rate Estimation and Linear Source Model" Joong-Yun et al. Sep. 9, 2005 IEEE.*
"Accurate Bit Allocation and Rate Control for DCT Domain Video Transcoding" Zhijun et al. 2002 IEEE.*

* cited by examiner

*Primary Examiner* — Christopher S Kelley
*Assistant Examiner* — Mohammed Jebari
(74) *Attorney, Agent, or Firm* — Graybeal Jackson LLP

(57) ABSTRACT

An embodiment of the present disclosure relates to system comprises an encoding device. Said encoding device comprises a compression unit, a quantizer, a bit estimator, a bit rate encoder and a variable length encoder. An embodiment also is a method of encoding. Said method estimates a number of bits to encode a macroblock after compressing the data stream. Then the estimated bit encoded by a bit rate encoder and further quantized by the quantizer to get the final encoded bit stream. The number of bits required to encode a macroblock is estimated after the quantization process and before the encoding process. The macroblock bit estimator estimates the number of bits required to encode a particular macroblock depending on the quantized AC coefficients of that macroblock and the quantized AC coefficients of the neighboring frames normalized at a macroblock level.

55 Claims, 6 Drawing Sheets

SYSTEM AND METHOD FOR VIDEO ENCODING

PRIORITY CLAIM

The instant application claims priority to Indian Patent Application No. 2802/Del/2008, filed Dec. 11, 2008, which application is incorporated herein by reference.

TECHNICAL FIELD

An embodiment of present disclosure relates to a method and a system for video encoding and more particularly relates to a method for estimating a number of bits to encode a macroblock in a Digital Video Encoder.

BACKGROUND

Analog video communication and storage systems have today been replaced by their digital counterparts to a large extent. To solve the problem of excessive data rate generated by digital systems number of digital video compression techniques such as Moving Picture Image Coding Experts Group (MPEG-1), MPEG-2[1], MPEG-4, H.264[2], VC-1[3] have evolved.

Rate Control is an important technology that is responsible for video quality while working in a framework of constrained bit-rate to achieve compression.

In terms of the transmission style, rate-control schemes may be classified as Constant Bitrate (CBR) control for the constant-channel-bandwidth video transmission, and Variable Bitrate (VBR) control for the variable-channel-bandwidth, and constant quality video transmission. In terms of the granularity of rate-control operation, these rate-control schemes may be classified as:
1. Macroblock Layer rate control
2. Slice Layer rate control
3. Frame Layer rate control In a constant bit rate control algorithm which works at the macroblock level, i.e it varies the quantization parameter (qp) from one macroblock to another. The decision to increment or decrement the qp for the current macroblock, m1, is taken depending on the state of the encoder buffer fullness at that instant and the number of bits consumed by the encoding of the current macroblock. To determine the state of the buffer fullness, one needs to know the number of bits that have been consumed for encoding all the macroblocks before m1. To determine the number of bits consumed, the current macroblock is Entropy Coded and the entropy coding schemes used inside popular video coding standards include VLC, CAVLC, CABAC etc.

One solution to the above problem is to do the variable length coding (VLC) for each macroblock and calculate the number of bits required to encode each.

Consider another problem wherein the encoder decides the encoding mode for a macroblock. Of the various modes available, it decides the one which would give the best compression i.e. achieving the target bitrate at optimum quality. In this scenario, an encoder may carry out a entropy coding for each mode and determine the number of bits required for each mode. It may then select the mode which meets the target bitrate keeping minimum quality loss. FIG. 1 illustrates a system to calculate the number of bits required to encode a Macroblock.

Entropy coding may be a computationally expensive process, and today's rate control algorithms available for video encoding may require many iterations of an entropy coding process to achieve the best quantization level/mode for the macroblock. The entropy coding process may be avoided by estimating the number of bits required to encode a macroblock rather than computing the exact number of bits.

Methods utilizing rate control for constant-bit-rate finite-buffer-size video encoder may perform bit estimation from the complexity value for the pixel block, where the complexity value is calculated as a sum of absolute differences between pixel value and the average pixel value.

Additional techniques for estimating and controlling the number of bits output from a video coder may use a relationship between the quantization parameter and the coding mode of the blocks, to estimate the number of encoded bits.

In some existing variable bit-rate control methods, video encoding quantization levels depend upon the difference between the coded bits and target bits allocated to each coded MB. Thresholds are defined which estimate the error to determine the change in quantization levels.

Existing technology may also propose a linear relationship between the coding bit rate and the percentage of zeros among the quantized transform coefficients.

For example, the low-complexity macroblock mode selection for H.264/AVC encoders method uses a similar model to estimate the number of bits required for sending quantized transform coefficients.

The total bit count for encoding a frame in the existing method is calculated from the average bit count of the VLC table and the total number of code words (quantized non-zero AC coefficients) in the frame.

In a macroblock data classification and nonlinear bit count estimation for low delay H.263, rate control, the average table bit count is calculated from the probability distribution of each code word and the bits required for encoding each code word. A class for a macroblock is obtained from its coding mode and its scalar quantized data statistic(s). Each unique combination of class and quantization parameter is mapped to a unique nonlinear estimate of the number of coding bits for the macroblock.

BRIEF DESCRIPTION OF THE DRAWINGS

Features of one or more embodiments of the present disclosure will be explained in the following description, taken in conjunction with the accompanying drawings, wherein.

DETAILED DESCRIPTION

Figure 1:
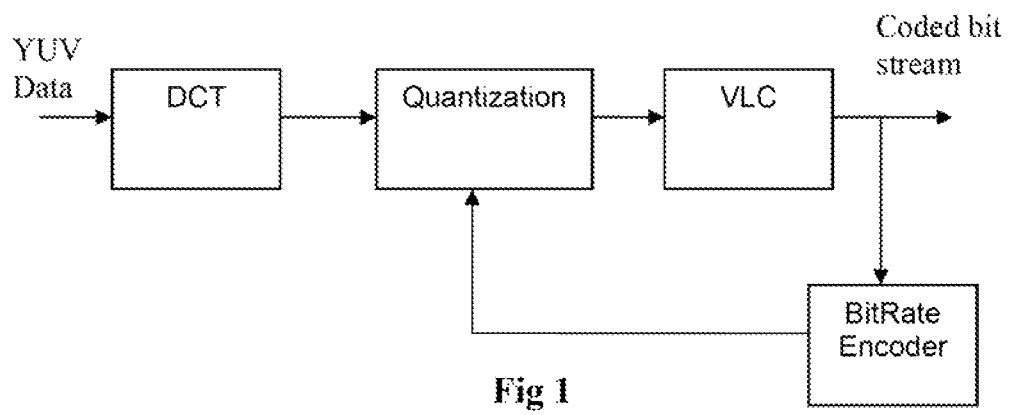
FIG. 1 illustrates a conventional system for calculating a number of bits required to encode a Macroblock.

One or more embodiments of the present disclosure will now be described in detail with reference to the accompanying drawings. However, the present disclosure is not limited to the embodiments. The present disclosure may be modified in various forms. Thus, one or more embodiments of the present disclosure are only provided to explain more clearly concepts presented in present disclosure. In the accompanying drawings, like reference numerals are used to indicate like components.

An embodiment of the present disclosure is an encoding device, said device comprises a compression unit, a quantizer, a bit estimator, a bit rate encoder and a variable length encoder. The compression unit processes sampled digitalized data composed of plurality of macroblocks and provides compressed data. The quantizer receives the compressed data from the compression unit and provides further compressed data. The bit estimator coupled to said quantizer estimates the number of bits to encode a macroblock. The bit rate encoder receives the number of estimated bits from the bit estimator and provides encoded data to the quantizer as a feedback. The output of quantizer further processed through variable length coding process by the variable length encoder to get a coded bit stream.

The present disclosure also teaches a bit estimator for estimating the number of bits to encode a macroblock. Said bit estimator comprises a current frame macroblock bit estimator and a second bit calculator and a linear estimator. Said first bit estimator obtains a number of bits required to encode the previously coded macroblocks in the current frame. Said previous frames bit estimator obtains the number of bits required to encode the previous frames. The linear estimator receives data from the first and previous frames bit estimators and performs a linear function of said data to estimate the exact number of bits required to encode the current macroblock in the current frame.

An embodiment of the present disclosure is a system which includes an encoding device. Said device includes a compression unit, a quantizer, a bit estimator, a bit rate encoder and a variable length encoder. The compression unit processes sampled digitalized data composed a of plurality of macroblocks and provides compressed data. The quantizer receives the compressed data from the compression unit and provides further compressed data. The bit estimator coupled to said quantizer estimates the number of bits to encode a macroblock. The bit rate encoder receives the number of estimated bits from the bit estimator and provides the quantization parameter to the quantizer as a feedback. The output of quantizer is further processed through an entropy coding process by the variable length encoder to get a coded bit stream.

An embodiment of the present disclosure is a method of encoding. Said method processes sampled digitalized data composed of a plurality of macroblocks and provides data compressed by a compression unit. The compressed data is further processed by a quantizer to obtain further compressed data. A bit estimator receives said compressed data and estimates a number of bits to encode a macroblock. In the next step, the number of estimated bits are received by a video encoder, and the quantization parameter is supplied as a feedback to the quantizer, which performs quantization and which provides the quantized data to the variable length coder, which provides a coded bit stream.

An embodiment of the present disclosure is a method for estimating a number of bits to encode a macroblock. Said method obtains a number of bits required to encode the macroblock in a current frame by a first bit estimator and a number of bits required to encode the current frame by a second bit estimator. A linear estimator receives the estimated bits from the first and second bit estimators and performs a linear function of said estimated bits to estimate the exact number of bits required to encode the macroblock in the current frame.

An embodiment of the present disclosure is a method for estimating the number of bits to encode a macroblock. The coding bitrate is a function of the number of non-zero quantized transform coefficients and the number of bits required to encode the macroblocks of the neighboring frames.

An embodiment of a system of the present disclosure estimates the number of bits required to encode a macroblock, which number may be used where one needs to estimate the number of bits required for encoding a macroblock in a particular mode and hence decide the optimum coding mode without doing entropy coding each time.

In an embodiment of a system, the coding bitrate is a function of the number of non-zero valued quantized transform coefficients of the current macroblock under consideration and the number of non-zero transform coefficients of the neighboring frames normalized over a number of macroblocks. Simulation results show that at least one embodiment proposed provides predictions with enhanced accuracy.

Figure 2:
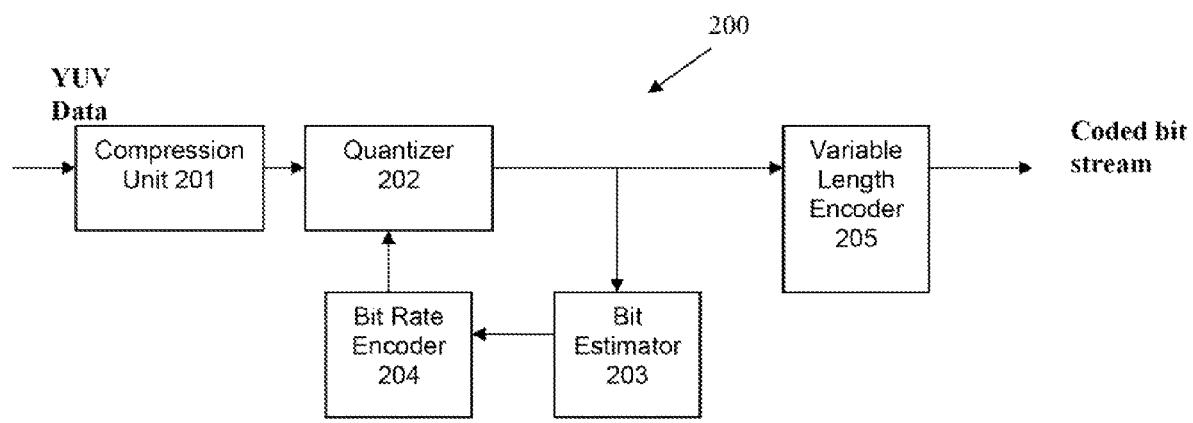
FIG. 2 illustrates a device for video encoding according to an embodiment of the present disclosure.

FIG. 2 illustrates an embodiment of a device for encoding video data using a bit estimator according to an embodiment of of the present disclosure. Said device includes a compression unit, a quantizer, a bit estimator, a bit rate encoder and a variable length encoder. The compression unit processed sampled digitalized data composed of a plurality of macroblocks, and provides compressed data. The quantizer receives the compressed data from the compression unit and provides a further compressed data. The bit estimator coupled to said quantizer estimates the number of bits to encode a macroblock. The estimated number of bits is received by the bit rate encoder, which generates a quantization parameter provided to the quantization process as a feedback to the quantizer. The output of the quantizer is further processed by the entropy encoder in the VLC encoder 205 to get the coded bit stream.

Figure 3:
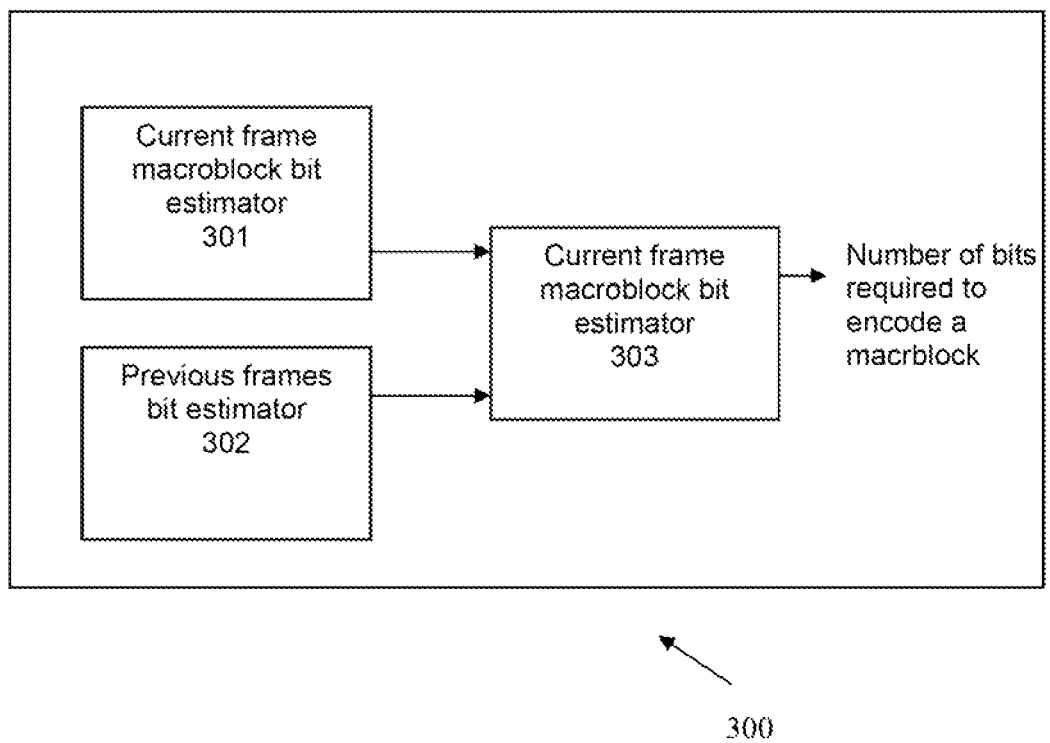
FIG. 3 illustrates a block diagram representation of a Macroblock bit estimator according to an embodiment of the present disclosure

FIG. 3 illustrates a embodiment of the macroblock bit estimator 203 of FIG. 2. The macroblock bit estimator 203 estimates the number of bits required to encode a particular macroblock, m1, depending on the quantized AC coefficients of m1, and the quantized AC coefficients of the neighboring frames normalized at a macroblock level by a current frame macroblock bit estimator (301).

The bit estimate for the macroblock is done before encoding when the quantized AC coefficients are available. The quantized AC coefficients of a macroblock may have zero or non-zero values. The higher the QP, the higher the number of zero coefficients in the macroblock and the lower the number of bits required to encode the macroblock. Similarly, the lower the QP, the lower the number of zero coefficients and the higher the number of bits required to encode the macroblock. Hence, it may be said that the number of bits required to encode a macroblock is a function of the number of non-zero AC coefficients of the macroblock represented by the equation (1):

$$\text{Bitestimate}_{i,j} = \Box f(x_{i,j}) \tag{1}$$

Where 'x' : number of non-zero AC coefficients
'i': current frame number
'j': current macroblock number.

Therefore, the bit estimate for the $j^{th}$ macroblock of the $i^{th}$ frame is a function of the number of non-zero AC coefficients of the same macroblock. In a CBR algorithm, the output bitrate is approximately constant, fluctuating within a certain bandwidth, for example ±2%, around a target bitrate. In order to maintain this approximately constant bitrate, the number of bits required to encode a particular frame will be a function of the number of bits required to encode the neighboring frames.

The number of bits required to encode the neighboring frames is a function of the number of non-zero AC coefficients in those frames. Thus, the number of bits required to encode a frame is also a function of the number of non-zero AC coefficients in the neighboring frames, this number being calculated by a previous frames bit estimator (302). The same number may be normalized to a macroblock level. The number of bits required to encode a macroblock is a function of the number of AC coefficients in previous frames normalized by the number of macroblocks in a frame as described by equation (2).

$$\text{Bitestimate}_{i,j} = f(y_k, \ldots y_l) \qquad (2)$$

Where k . . . l:frame numbers
k. . . l<i
$y_k$: Normalized number of non-zero AC coefficients in frame 'k'

Therefore, the bit estimate for the $j^{th}$ macroblock of $i^{th}$ frame is a function of the number of AC coefficients in frames k . . . l, normalized to a macroblock level.

From equations (1) and (2), it may be said that a bit estimate of a macroblock is a linear function of both the number of non-zero AC coefficients of that macroblock and the normalized number of AC coefficients in neighboring frames as explained by equation (3):

$$\text{Bitestimate}_{i,j} = \sum_{m=1} a_m y_{(i-m)} + a_0 * x_{i,j} \qquad (3)$$

Where m=0, . . . N−1
i=0. . . ∞
'N'=integer constant
'$a_m$'=weight

Figure 4:
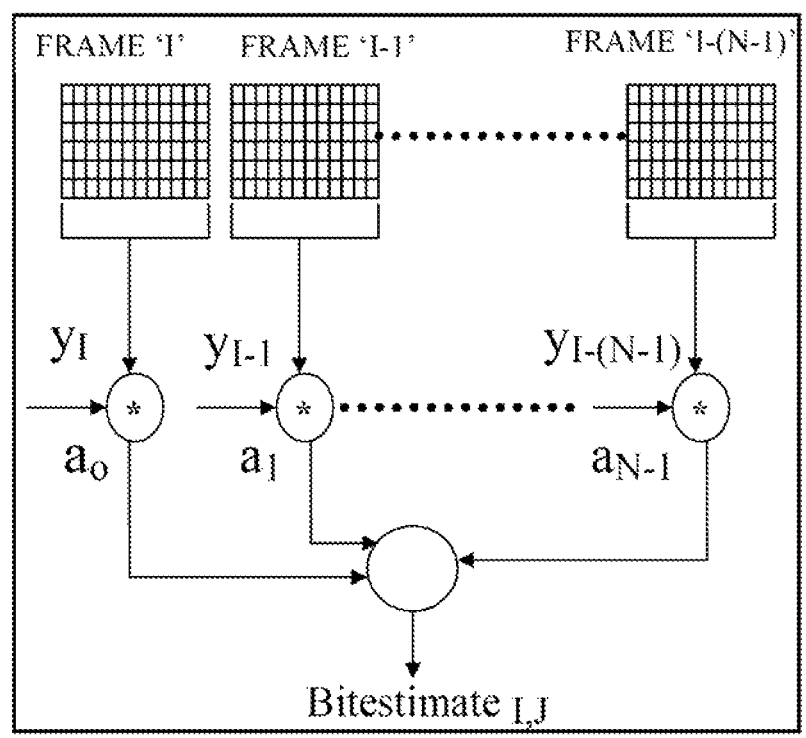
FIG. 4 illustrates a schematic diagram of a Macroblock bit estimator according to an embodiment of the present disclosure

FIG. 4 represents the above mentioned equation 3. Where 'a' is [[ ]]a set of weights attached to the non-zero AC coefficients 'x' and 'N' is the number of neighbors who contribute to the bit estimate of the current macroblock.

$$a_m^{(i)} = a_m^{(i-1)} + \frac{\mu * e_i * x_{i-m}}{\sum_{m=0}^{N-1} x_{i-m}^2} \qquad (4)$$

The set of weights 'a' are updated after each frame as per the equation (4). In the equation 'μ' is a step size for the iteration and '$e_i$[[ ]]' is the error in the estimation of the bits in the ith frame normalized by the number of macroblocks in a frame. If bit consumption process is well behaved the weights will converge toward or to a fixed value.

The bit estimate technique described above may be applied in an encoder with CBR control. The CBR algorithm determines the QP of macroblock, m1, depending on the number of bits used for coding the stream before m1, and the number of bits used for coding the current macroblock. To determine the number of bits used for coding the current macroblock without performing the entropy coding step for the current macroblock, an embodiment of the technique of the present disclosure may be used.

Table 1, describes the mean error in estimation per macroblock for various sequences at different bitrates.

| Sequence | Size | Number of Frames | Bitrate | Estimate Error per macroblock (bits) |
| --- | --- | --- | --- | --- |
| Children | 352 * 288 | 300 | 2 mbps | 0.1027 |
|  |  |  | 1 mbps | 0.0831 |
|  |  |  | 500 kbps | 0.1540 |

-continued

| Sequence | Size | Number of Frames | Bitrate | Estimate Error per macroblock (bits) |
| --- | --- | --- | --- | --- |
| Akiyo | 352 * 288 | 300 | 2 mbps | 0.4108 |
|  |  |  | 1 mbps | 0.6285 |
|  |  |  | 900 kbps | 1.2237 |
| Foreman | 352 * 288 | 300 | 2 mbps | 0.3234 |
|  |  |  | 1 mbps | 0.0988 |
|  |  |  | 500 kbps | 0.3777 |
| Walk | 176 * 144 | 300 | 1 mbps | 1.0767 |
|  |  |  | 500 kbps | 0.3414 |
|  |  |  | 300 kbps | 0.1760 |
| Films | 720 × 576 | 908 | 3 mbps | 0.4334 |
|  |  |  | 4 mbps | 0.5363 |
|  |  |  | 5 mbps | 1.0809 |
| City | 1280 × 720 | 900 | 10 mbps | 0.1035 |
|  |  |  | 15 mbps | 0.1031 |

Figure 5:
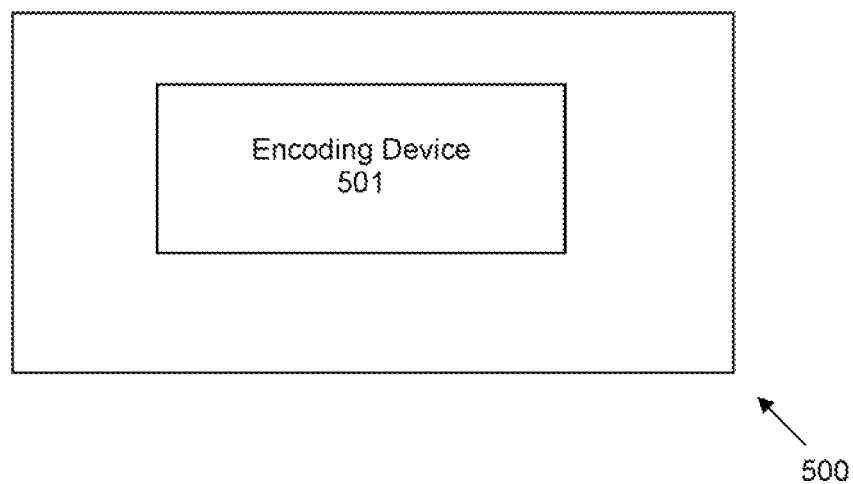
FIG. 5 illustrates a system for video encoding according to an embodiment of the present disclosure

FIG. 5 represents an embodiment of a system for video encoding. Said system (500) includes a device (501) for video encoding.

Figure 6:
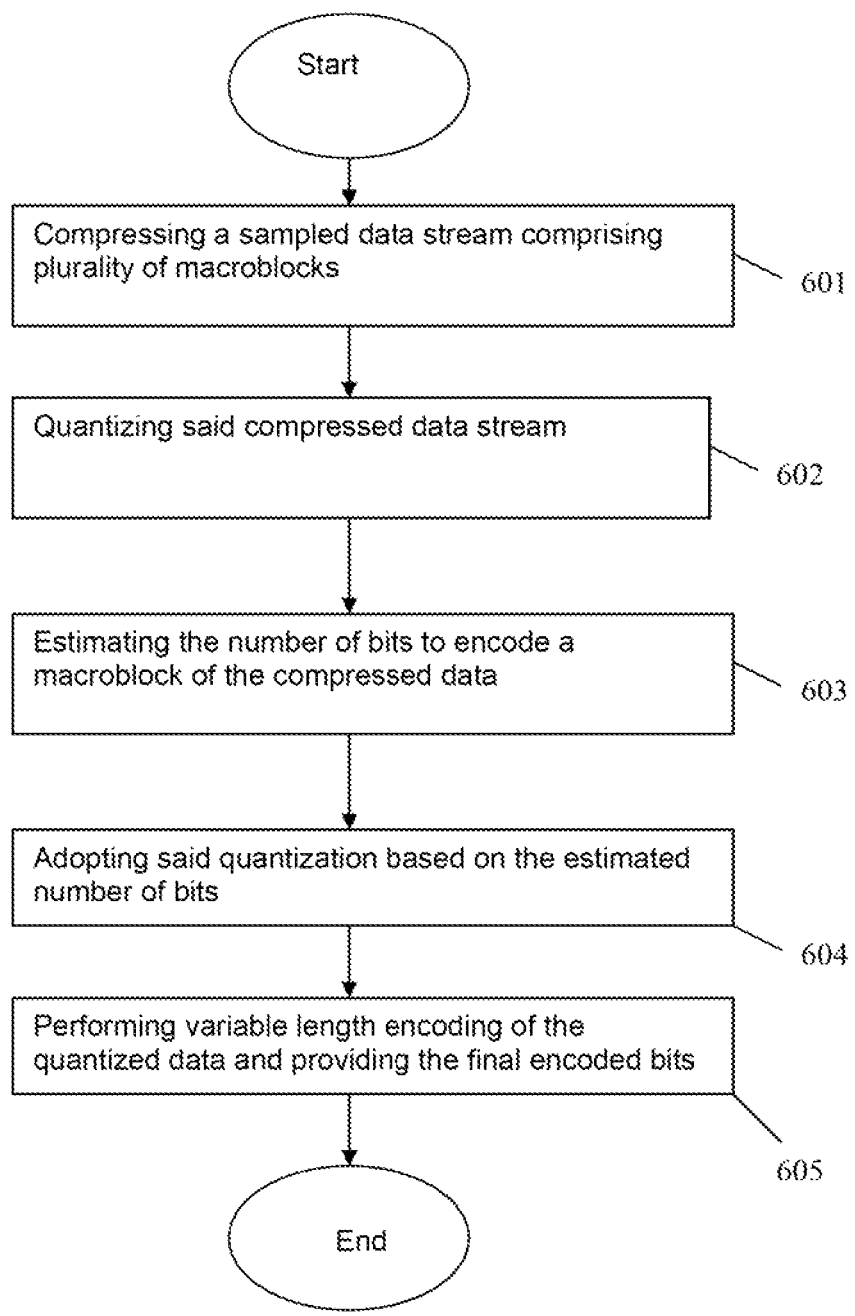
FIG. 6 illustrates a method of video encoding according to an embodiment of the present disclosure.

FIG. 6 represents an embodiment of a method of encoding. In step 601 sampled digitalized data composed of plurality of macroblocks is processed and provides a compressed data by a compression unit. The compressed data further processed by a quantizer to obtain further compressed data in step 602. A bit estimator receives said compressed data and estimates a number of bits to encode a macroblock in step 603. In the next step 604, an estimated number bits is received by a video encoder and the encoded data are supplied as a feedback to the quantizer for adopting quantization. Then in step 605 the variable length encoder performs a variable length encoding to provide final a coded bit stream.

The video functions and algorithms described above may be performed in software, hardware, or a combination of software and hardware. And an embodiment of the above-described video system may be part of a larger system such as a computer system.

Although the disclosure of the instant disclosure has been described in connection with one or more embodiments of the present disclosure, it is not limited thereto. It will be apparent to those skilled in the art that various substitutions, modifications and changes may be made thereto without departing from the scope and spirit of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:
1. A system comprising an encoding device comprising:
a compression unit;
a quantizer coupled to the output of said compression unit;
a bit estimator coupled directly to the output of said quantizer;
an iterative bit rate encoder receiving the output of said bit estimator and the output of said encoder coupled to the control input of said quantizer; and
a variable length encoder coupled to the output of said quantizer and providing the final encoded bits stream;
wherein said bit estimator includes:
a current frame macroblock bit estimator;
a previous frames bit estimator configured to generate a bit estimation, such that the bit estimation is based on at least two sets of groupings of data in the bit stream corresponding to at least two previous bit estimations and each grouping having a weight attached to non-zero AC coefficients different from any other grouping weighting such that each grouping weighting is greater than any previous grouping weighting; and a linear estimator coupled to said current frame macroblock bit estimator and said previous frames bit estimator.

2. The system as claimed in claim 1, wherein the current frame macroblock bit estimator configured to obtain the number of bits required to encode the macroblock in a current frame.

3. The system as claimed in claim 1, wherein the previous frame bit estimator is configured to obtain the number of bits required to encode the previous frames.

4. The system as claimed in claim 1, wherein the linear estimator is configured to performed a linear function of the output of said current frame macroblock bit estimator and said previous frame bit estimator to estimate the exact number of bits required to encode the macroblock in the current frame.

5. The system as claimed in claim 2, wherein the current frame macroblock bit estimator is configured to obtain the number of bits required to encode the macroblock by performing a function of number of non-zero AC coefficient of said macroblock.

6. The system as claimed in claim 3, wherein the previous frame bit estimator is configured to obtain the number of bits required to encode the current frame by performing a function of number of AC coefficients in previous frames normalized at macroblock level.

7. The system as claimed in claim 4, wherein a linear estimator is configured to estimate an exact number of bits required to encode the macroblock in the current frame by performing a linear function of both the number of non-zero AC coefficients of that macroblock and the normalized number of AC coefficients in the previous frames.

8. The system as claimed in claim 4, wherein the bit estimation is configured to depend upon the weights attached to the non-zero AC coefficients of the macroblocks and the number of previous frames involved in the bit estimation of the macroblock in the current frame.

9. An encoding device comprising:
a compression unit;
a quantizer coupled to the output of said compression unit;
an iterative bit estimator coupled to the output of said quantizer without any intervening elements that affect an encoded bits stream;
a bit rate encoder configured to receive the output of said bit estimator and the output of said encoder coupled to the control input of said quantizer;
a variable length encoder coupled to the output of said quantizer; and
to provide the final encoded bits stream;
wherein said bit estimator includes:
  a current frame macroblock bit estimator;
  a previous frames bit estimator configured to generate a bit estimation, such that the bit estimation is based on at least two sets of groupings of data in the bit stream corresponding to at least two previous bit estimations and each grouping having a weight attached to non-zero AC coefficients different from any other grouping weighting such that each grouping weighting is greater than any previous grouping weighting; and
  a linear estimator coupled to said current frame macroblock bit estimator and said previous frames bit estimator.

10. The encoding device as claimed in claim 9, wherein the current frame macroblock bit estimator is configured to obtain the number of bits required to encode the macroblock in a current frame.

11. The encoding device as claimed in claim 9, wherein the previous frame bit estimator is configured to obtain the number of bits required to encode the previous frames.

12. The encoding device as claimed in claim 9, wherein the linear estimator is configured to perform a linear function of the output of said current frame macroblock bit estimator and said previous frame bit estimator to estimate the exact number of bits required to encode the macroblock in the current frame.

13. The encoding device as claimed in claim 9, wherein the current frame macroblock bit estimator is configured to obtain the number of bits required to encode the macroblock by performing a function of number of non-zero AC coefficient of said macroblock.

14. The encoding device as claimed in claim 10, wherein the previous frame bit estimator is configured to obtain the number of bits required to encode the current frame by performing a function of number of AC coefficients in previous frames normalized at macroblock level.

15. The encoding device as claimed in claim 11, wherein a linear estimator is configured to estimate an exact number of bits required to encode the macroblock in the current frame by performing a linear function of both the number of non-zero AC coefficients of that macroblock and the normalized number of AC coefficients in the previous frames.

16. The encoding device as claimed in claim 11, wherein the bit estimation is configured to depend upon the weights attached to the non-zero AC coefficients of the macroblocks and the number of previous frames involved in the bit estimation of the macroblock in the current frame.

17. A method of encoding comprising:
compressing a sampled data stream comprising a plurality of macroblocks;
quantizing said compressed data stream;
obtaining a number of bits required to encode the macroblock in a current frame:
obtaining a number of bits required to encode at least two previous frames:
performing a linear function of said obtained numbers to estimate the exact number of bits required to encode the macroblock in the current frame such that the linear function includes weightings, attached to non-zero AC coefficients, of descending value corresponding to previous frames, respectively;
iteratively estimating the number of bits based upon the compressed data stream received directly after quantizing to encode a macroblock of the compressed data;
adapting said quantization based on the estimated number of bits after each estimation;
performing variable length encoding of the quantized data and providing the final encoded bits stream.

18. The method as claimed in claim 17, wherein a number of bits required to encode the macroblock is obtained by performing a function of a number of non-zero AC coefficient of said macroblock.

19. The method as claimed in claim 17, wherein a number of bits required to encode the current frame is obtained by performing a function of a number of AC coefficients in previous frames normalized at a macroblock level.

20. The method as claimed in claim 17, wherein an exact number of bits required to encode the macroblock in the current frame is estimated by performing a linear function of both the number of non-zero AC coefficients of that macroblock and the normalized number of AC coefficients in the previous frames.

21. The method as claimed in claim 20, wherein the bit estimation depends upon the weights attached to the non-zero AC coefficients of the macroblocks and the number of previous frames involved in the bit estimation of the macroblock in the current frame.

22. An encoder, comprising;
an estimator configured to iteratively estimate a number of bits for encoding a first portion of a stream of compressed data based on at least two sets of groupings, each grouping having a weight attached to non-zero AC coefficients different from any other grouping weighting such that each grouping weighting is greater than any previous grouping weighting and a number of compression coefficients in a second portion of the stream having a characteristic;
a generator configured to generate a quantization parameter in response to the estimated number of bits after each iteration; and
a quantizer configured to quantize the compressed data in response to the quantization parameter;
wherein the estimator estimates the bits based at least on the compressed data directly from the quantizer.

23. The encoder of claim 22 wherein the first portion comprises a block of a stream of video data.

24. The encoder of claim 22 wherein the first portion comprises a macroblock of a stream of video data.

25. The encoder of claim 22 wherein the second portion equals the first portion.

26. The encoder of claim 22 wherein the second portion includes at least part of the first portion.

27. The encoder of claim 22 wherein the second portion precedes the first portion in the stream of compressed data.

28. The encoder of claim 22 wherein:
the first portion comprises a macroblock of a first video frame; and
the second portion comprises at least a second video frame that precedes the macroblock in the stream of compressed data.

29. The encoder of claim 22 wherein:
the second portion includes the first portion and a third portion of the data stream that precedes the first portion; and
the estimator is configured to estimate the number of bits for encoding the first portion of the stream based on a combination of the number of compression coefficients in the first and third portions having the characteristic.

30. The encoder of claim 22 wherein the compression coefficients comprise discrete cosine transform coefficients.

31. The encoder of claim 22 wherein the compression coefficients comprise AC discrete cosine transform coefficients.

32. The encoder of claim 22 wherein having the characteristic comprises being nonzero.

33. The encoder of claim 22 wherein the quantizer is configured to divide each value of the compressed data by the quantization parameter.

34. The encoder of claim 22 wherein the estimator is configured to receive the stream of quantized compressed data from the quantizer.

35. The encoder of claim 22, further comprising a variable length coder configured to variable length code the quantized compressed data from the quantizer.

36. The encoder of claim 22, further comprising a data compressor configured to generate the stream of compressed data.

37. The encoder of claim 22, further comprising:
wherein the estimator is configured to receive the stream of quantized compressed data from the quantizer; and
a data compressor configured to generate and provide to the quantizer a stream of unquantized compressed data.

38. A system, comprising:
a first integrated circuit comprising
an image data generator configured to generate a stream of image data; and
an image data encoder, comprising:
a data compressor configured to generate a stream of compressed data;
a quantizer configured to quantize the stream of compressed data in response to a quantization parameter;
an estimator configured to iteratively estimate a number of bits for encoding a first portion of the stream of quantized compressed data based on at least two sets of differently weighted groupings, each grouping having a weight attached to non-zero AC coefficients different from any other grouping weighting such that each grouping weighting is greater than any previous grouping weighting and a number of compression coefficients in a second portion of the stream of quantized compressed data having a characteristic such that the estimator estimates the bits based at least on the compressed data directly from the quantizer; and
a generator configured to generate the quantization parameter in response to the estimated number of bits after each iteration; and
a second integrated circuit coupled to the first integrated circuit.

39. The system of claim 38 wherein the image data comprises video data.

40. The system of claim 38 wherein the first integrated circuit further comprises a pixel array coupled to the image data generator.

41. A method, comprising:
iteratively estimating a number of bits for encoding a first portion of a stream of compressed data based on at least two sets of differently weighted groupings, each grouping having a weight attached to non-zero AC coefficients different from any other grouping weighting such that each grouping weighting is greater than any previous grouping weighting and a number of compression coefficients in a second portion of the stream having a characteristic;
generating a quantization parameter in response to the estimated number of bits after each iteration; and
quantizing the compressed data in response to the quantization parameter;
wherein the estimating is based on the compressed data directly after quantizing.

42. The method of claim 41 wherein:
the first portion comprises a macroblock of a first video frame; and
the second portion comprises at least a second video frame that precedes the macroblock in the stream of compressed data.

43. The method of claim 41 wherein quantizing comprises dividing each value of the compressed data by the quantization parameter.

44. The method of claim 41 wherein estimating comprises estimating the number of bits for encoding a first portion of the stream of quantized compressed data.

45. The method of claim 41, further comprising variable length coding the quantized compressed data.

46. A method, comprising:
generating a stream of compressed data;
quantizing the stream of compressed data in response to a quantization parameter;
iteratively estimating a number of bits for encoding a first portion of the stream of quantized compressed data directly after quantizing based on at least two sets of differently weighted groupings, each grouping having a weight attached to non-zero AC coefficients different from any other grouping weighting such that each grouping weighting is greater than any previous grouping weighting and a number of compression coefficients in a second portion of the stream of quantized compressed data having a characteristic; and
generating the quantization parameter in response to the estimated number of bits after each iteration.

47. The method of claim 46 wherein the second portion includes at least part of the first portion.

48. The method of claim 46 wherein the second portion precedes the first portion in the stream of quantized compressed data.

49. The method of claim 46 wherein a compression coefficient has the characteristic if the compression coefficient is nonzero.

50. The method of claim 46 wherein estimating comprises estimating the number of bits based on at least one weighting coefficient.

51. The method of claim 46, further comprising:
wherein estimating comprises estimating the number of bits based on at least one weighting coefficient; and
generating the at least one weighting coefficient based on an error in estimating a number of previous bits in the stream of quantized compressed data.

52. The method of claim 46, further comprising:
wherein estimating comprises estimating the number of bits based on at least one weighting coefficient; and
generating the at least one weighting coefficient based on an error in estimating a number of previous bits in the stream of quantized compressed data.

53. The method of claim 46, further comprising:
wherein estimating comprises estimating the number of bits based on at least one weighting coefficient; and
generating the at least one weighting coefficient based on a number of compression coefficients in third portion of the stream of quantized compressed data having the characteristic, the third portion preceding the first portion.

54. The method of claim 46, further comprising:
wherein estimating comprises estimating the number of bits based on at least one weighting coefficient; and
generating the at least one weighting coefficient based on a previously generated weighting coefficient.

55. The method of claim 46, further comprising:
wherein estimating comprises estimating the number of bits based on at least one weighting coefficient; and
generating the at least one weighting coefficient based on a step function.

* * * * *